United States Patent
Kojima et al.

(10) Patent No.: US 9,062,764 B2
(45) Date of Patent: Jun. 23, 2015

(54) CLUTCH CONTROL SYSTEM FOR TRANSMISSION

(75) Inventors: Hiroyuki Kojima, Saitama (JP); Kazunari Iguchi, Saitama (JP); Kazuma Morimitsu, Saitama (JP); Takashi Ozeki, Saitama (JP); Yoshiaki Tsukada, Saitama (JP); Shigeru Tajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1474 days.

(21) Appl. No.: 12/274,185

(22) Filed: Nov. 19, 2008

(65) Prior Publication Data

US 2009/0132133 A1   May 21, 2009

(30) Foreign Application Priority Data

Nov. 21, 2007  (JP) ................................. 2007-301585
Nov. 30, 2007  (JP) ................................. 2007-310435

(51) Int. Cl.
| G06F 7/00 | (2006.01) |
| G06F 17/00 | (2006.01) |
| G06F 19/00 | (2011.01) |
| F16H 61/12 | (2010.01) |
| F16H 59/70 | (2006.01) |

(52) U.S. Cl.
CPC ............... *F16H 61/12* (2013.01); *F16H 59/70* (2013.01); *F16H 2061/1208* (2013.01); *F16H 2061/1244* (2013.01); *F16H 2061/1204* (2013.01); *F16H 2061/1264* (2013.01)

(58) Field of Classification Search
CPC .............. F16D 48/06; F16D 48/066; F16D 2500/3026; F16H 61/143; B60W 10/02; B60W 30/18; B60W 10/06

USPC ......... 701/67, 68; 477/77–89, 122, DIG. 906; 475/904; 192/3.58, 85.63

See application file for complete search history.

(56) References Cited

U.S. PATENT DOCUMENTS

| 4,899,858 | A | * | 2/1990 | Cote et al. ...................... 477/83 |
| 5,469,946 | A | * | 11/1995 | Nguyen .................... 192/3.58 |
| 2004/0112171 | A1 | * | 6/2004 | Kuhstrebe et al. ........... 74/730.1 |
| 2006/0009326 | A1 | * | 1/2006 | Stefina ........................ 477/127 |

(Continued)

FOREIGN PATENT DOCUMENTS

| EP | 1 531 292 A2 | 5/2005 |
| EP | 1 847 732 A2 | 10/2007 |

(Continued)

*Primary Examiner* — Jeffrey Shapiro
(74) *Attorney, Agent, or Firm* — Birch, Stewart, Kolasch & Birch, LLP (57) ABSTRACT

A clutch control system for a transmission for detecting if hydraulic control during shifting is not executed. A first clutch and a second clutch are switched from a disengagement state to an engagement state by receiving a predetermined pressure generated by a hydraulic pump. A transmission executes shifting to an adjacent gear step by operation of switching the engagement state of the first clutch and of the second clutch from one side to the other side. If an elapse time t from the start of clutch switching operation reaches a predetermined time and an input-output speed ratio which is a ratio between engine speed and counter shaft rotational number falls within a predetermined range corresponding to a gear step before shifting, the transmission control unit discontinues the clutch switching operation by stopping the supply of hydraulic pressure to the other side clutch to bring it into the disengagement state.

18 Claims, 9 Drawing Sheets

(56) References Cited

U.S. PATENT DOCUMENTS

| | | | |
|---|---|---|---|
| 2006/0231011 A1* | 10/2006 | Kamimura et al. | 116/28.1 |
| 2006/0254845 A1* | 11/2006 | Baasch et al. | 180/233 |
| 2006/0272919 A1* | 12/2006 | Kawamoto et al. | 192/88 R |
| 2007/0175720 A1* | 8/2007 | Yoshida et al. | 192/3.63 |

FOREIGN PATENT DOCUMENTS

| | | |
|---|---|---|
| JP | 58-146749 A | 9/1983 |
| JP | 06-074327 A | 3/1994 |
| JP | 10-299884 A | 11/1998 |
| JP | 11-82720 A | 3/1999 |
| JP | 2005-273805 A | 10/2005 |
| JP | 2006-283816 A | 10/2006 |
| JP | 2007-24079 A | 2/2007 |
| JP | 2007-107667 | 4/2007 |
| WO | WO-2007-101418 A1 | 9/2007 |

\* cited by examiner

CLUTCH CONTROL SYSTEM FOR TRANSMISSION

CROSS-REFERENCE TO RELATED APPLICATIONS

The present application claims priority under 35 USC 119 to Japanese Patent Application No. 2007-310435 filed on Nov. 30, 2007 and Japanese Patent Application No. 2007-310585 filed on Nov. 21, 2007 the entire contents of which are hereby incorporated by reference.

BACKGROUND OF THE INVENTION

1. Field of the Invention

The present invention relates generally to a clutch control system for a transmission. More particularly, to a clutch control system for a transmission that can detect the fact that hydraulic control during shifting is not executed as previously planned by detecting an input-output speed ratio of the transmission to appropriately deal with such an event. In addition, the present invention generally relates to gear shift control apparatuses for a motorcycle. More particularly, to a gear shift control apparatus that detects the turning state of the vehicle based on a difference in rotational speed between front and rear wheels for prohibiting automatic gear shifting.

2. Description of Background Art

A transmission is known that includes a hydraulic pump driven by the rotational drive force of an engine and exercises engagement-disengagement control on a clutch by the hydraulic pressure generated by the hydraulic pump.

Japanese Patent Laid-Open No. Hei 11-82720 discloses a clutch control system for a 4-step speed-change type transmission including first through fourth clutches corresponding respectively to first-speed through fourth-speed gears. To drive the four clutches, this system can allow three shift valves to switch oil passages per se adapted to supply hydraulic pressure.

The clutch control system for a transmission disclosed in Japanese Patent Laid-Open No. Hei 11-82720 includes the shift valves as mentioned above as well as electromagnetic valves adapted to control supply of hydraulic pressure to the oil passages. Therefore, this system can individually control the four clutches. Consequently, even in the event wherein one electromagnetic valve causes a failure, the oil passage per se can be switched to another system to complete the shifting operation.

On the other hand, there is known a twin clutch type transmission that includes an electromagnetic valve used to alternately supply the hydraulic pressure generated by a hydraulic pump to two hydraulic clutches and executes shifting to an adjacent gear step by switching the operation of clutches wherein the supply destination of hydraulic pressure is switched from one of the clutches to the other. This twin clutch type transmission can reduce the number of component parts for hydraulic control to simplify the configuration of oil passages, thereby achieving downsizing and weight reduction of the transmission.

However, the twin clutch type transmission as mentioned above is not provided with a shift valve for switching the oil passages per se. Therefore, when the supply destination of hydraulic pressure is switched from one of the clutches to the other by the clutch switching operation, the hydraulic pressure of the one of the clutches may not be lowered due to any cause. In such a case, there is a possibility that both the clutches may simultaneously come into the engagement state along with the supply of hydraulic pressure to the other of the clutches. When the supply destination of hydraulic pressure is switched from one of the clutches to the other by the clutch switching operation, the hydraulic pressure of the other clutch may not increase due to any cause. In such a case, there is a possibility that the shifting operation may appropriately not be completed.

The invention described in Japanese Patent Laid-Open No. Hei 11-82720 can switch the oil passage per se to the separate system using the shift valve. Therefore, it does not make consideration of the problem specific to the twin clutch type transmission having the configuration described above.

An automatic gear shifting is known wherein a prohibition of the automatic gear shifting occurs during a turning maneuver (cornering) of a vehicle in a gear shift control apparatus that executes an automatic gear shifting on a transmission in response to vehicle speed or engine speed.

Japanese Patent Laid-Open No. 2007-107667 discloses an automatic gear shifting control apparatus for a four-wheeled vehicle configured to prohibit an automatic gear shifting by detecting the vehicle during a turning maneuver on the basis of a difference in rotational speed between left and right wheels.

However, the gear shift control apparatus of Japanese Patent Laid-Open No. 2007-107667 detects a turning state on the basis of the rotational speed difference between the left and right wheels of the four-wheeled vehicle. Japanese Patent Laid-Open No. 2007-107667 does not discuss the detection of such a turning state applied to motorcycles having only a front and a rear wheel aligned with each other in the back and forth direction of a vehicle body.

SUMMARY AND OBJECTS OF THE INVENTION

It is an object of an embodiment of the present invention to solve the problem relating to the conventional technique discussed and to provide a clutch control system for a transmission that can detect the fact that hydraulic control during shifting is not executed as previously planned by detecting an input-output speed ratio of the transmission for appropriately deal with such an event.

To achieve an object according to an embodiment of the present invention, a clutch control system for a transmission having a plurality of hydraulic clutches on one side and on the other side is provided that includes a control section configured to control the supply of hydraulic pressure to each of the hydraulic clutches switched from a disengagement state to an engagement state upon receiving a predetermined hydraulic pressure generated by a hydraulic pump. A transmission is provided wherein shifting to an adjacent gear step occurs by operation of a switching of the engagement state of the hydraulic clutches from one side to the other side. Input-output speed ratio detecting means are provided for detecting an input-output speed ratio of the transmission wherein the control section stops the switching operation of the clutches if an elapsed time from start of the switching operation reaches a predetermined time and the input-output speed ratio falls within a predetermined range corresponding to a gear step before shifting.

According to an embodiment of the present invention, the control section discontinues the switching operation by switching the other side clutch into the disengagement state.

According to an embodiment of the present invention, warning means is provided for warning that the switching operation is continued.

According to an embodiment of the present invention, a clutch control system is provided for a transmission having a plurality of hydraulic clutches on one side and on the other side. A control section is configured to control the supply of hydraulic pressure to each of the hydraulic clutches switched from a disengagement state to an engagement state upon receiving a predetermined hydraulic pressure generated by a hydraulic pump. A transmission is provided wherein shifting to an adjacent gear step occurs by operation of a switching of the engagement state of the hydraulic clutches from one side to the other side. Input-output speed ratio detecting means are provided for detecting an input-output speed ratio of the transmission. Pressure-increasing means are provided for temporarily increasing the hydraulic pressure supplied to each of the hydraulic clutches. The control section allows the pressure-increasing means to increase hydraulic pressure supplied to the other side clutches if an elapse time from start of the switching operation reaches a predetermined time and the input-output speed ratio lies outside the predetermined range corresponding to a gear step before shifting.

According to an embodiment of the present invention, the clutch control system includes the control section for controlling the supply of hydraulic pressure to each of the hydraulic clutches switched from a disengagement state to an engagement state upon receiving a predetermined hydraulic pressure generated by a hydraulic pump wherein the transmission in which shifting to an adjacent gear step by operation of the switching the engagement state of the hydraulic clutches from one side to the other side. The input-output speed ratio detecting means is provided for detecting an input-output speed ratio of the transmission. The control section discontinues the switching operation of the clutches if an elapsed time from start of the switching operation reaches a predetermined time and the input-output speed ratio falls within a predetermined range corresponding to a gear step before shifting. Therefore, the clutch control system detects that a clutch that is to be switched from the engagement state to the disengagement state at the time of shifting remains in the engagement state on the basis of a value of the input-output speed ratio and can discontinue the switching operation of the clutches. Thus, it is possible to avoid the so-called clutch interlock in which two clutches are simultaneously engaged to put a load thereon. In addition, the clutch interlock can be avoided without the provision of a sensor or the like for detecting the hydraulic pressure of each clutch.

According to an embodiment of the present invention, the control section discontinues the switching operation by switching the other side clutch into the disengagement state. Therefore, the clutch interlock can quickly be avoided by the operation of stopping the supply of hydraulic pressure to the other side clutches.

According to an embodiment of the present invention, the clutch control system includes the warning means for warning that the switching operation is discontinued. Thus, it is possible for an occupant to quickly recognize any failure occurring in the driving passage for the hydraulic clutches and enables prompt response such as discontinuance of the operation or check and repair.

According to an embodiment of the present invention, the clutch control system includes the control section for controlling the supply of hydraulic pressure to each of the hydraulic clutches switched from a disengagement state to an engagement state upon receiving a predetermined hydraulic pressure generated by a hydraulic pump. The transmission is provided wherein shifting to an adjacent gear step by operation of switching the engagement state of the hydraulic clutches from one side to the other side occurs. The input-output speed ratio detecting means is provided for detecting an input-output speed ratio of the transmission. The pressure-increasing means is provided for temporarily increasing hydraulic pressure supplied to each of the hydraulic clutches. The control section allows the pressure-increasing means to increase hydraulic pressure supplied to the other side clutches if an elapse time from start of the switching operation reaches a predetermined time and the input-output speed ratio lies outside the predetermined range corresponding to a gear step before shifting. Therefore, the clutch control system detects that the other side clutch that is to be switched into the engagement state at the time of shifting on the basis of a value of the input-output speed ratio remains between the disengagement state and the engagement state and increases the hydraulic pressure supplied to the other side clutch to complete shifting.

It is an object of an embodiment of the present invention to solve the problem of the conventional technique and to provide a gear shift control apparatus for a motorcycle that detects a turning state on the basis of a difference in rotational speed between front and rear wheels for prohibiting automatic gear shifting.

To achieve the above object according to an embodiment of the present invention, in a gear shift control apparatus for a motorcycle, including a control section configured to execute an automatic gear shifting on a transmission in response to at least vehicle speed and a rotational speed difference detecting means for detecting a difference in the rotational speed between a front wheel and a rear wheel and in that the control section, if the rotational speed of the front wheel is greater than that of the rear wheel and the rotational speed difference exceeds a predetermined value, determines that the motorcycle is in a turning maneuver and prohibits the automatic gear shifting.

According to an embodiment of the present invention, the control section prohibits the automatic gear shifting if the rotational speed difference exceeds a predetermined value and the vehicle speed is below a predetermined value.

According to an embodiment of the present invention, steering angle detecting means is provided for detecting a steering angle of the front wheel wherein the control section prohibits the automatic gear shifting if the rotational speed difference exceeds a predetermined value and the steering angle exceeds a predetermined value.

According to an embodiment of the present invention, the control section, if the rotational speed of the front wheel is greater than that of the rear wheel and the rotational speed difference exceeds a predetermined value, determines that the motorcycle is in a turning maneuver and prohibits the automatic gear shifting. Therefore, it is possible to detect the turning maneuver state using the characteristic of the motorcycle in which a difference in rotational speed between the front and rear wheels occurs during a turning maneuver and to prohibit the gear shifting during the turning maneuver. Thus, it is possible to enhance a feeling during the turning maneuver. In addition, since it can be determined that the motorcycle is in the turning maneuver by detecting the rotational speeds of the front and rear wheels without use of a transverse G sensor or the like, it is possible to suppress the increased number of component parts. Thus, an increase in the production costs and man-hours are reduced.

According to an embodiment of the present invention, the control section prohibits the automatic gear shifting if the rotational speed difference exceeds a predetermined value and the vehicle speed is below a predetermined value. Thus, by using the characteristic of the motorcycle in which during a turning maneuver with a small turning radius, the rotational speed difference between the front and rear wheels tends to increase and vehicle speed tends to lower, the control section can surely detect such a turning state and can prohibit the automatic gear shifting of a transmission.

According to an embodiment of the present invention, the apparatus includes the steering angle detecting means for detecting a steering angle of the front wheel and the control section prohibits the automatic gear shifting of the transmission if the rotational speed difference exceeds a predetermined value and the steering angle exceeds a predetermined value. Thus, by using the characteristic of the motorcycle in which during a turning maneuver with a small turning radius, the rotational speed difference between the front and rear wheels tends to increase and the steering angle tends to increase, the control section surely detects such a turning state and prohibits the automatic gear shifting of a transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
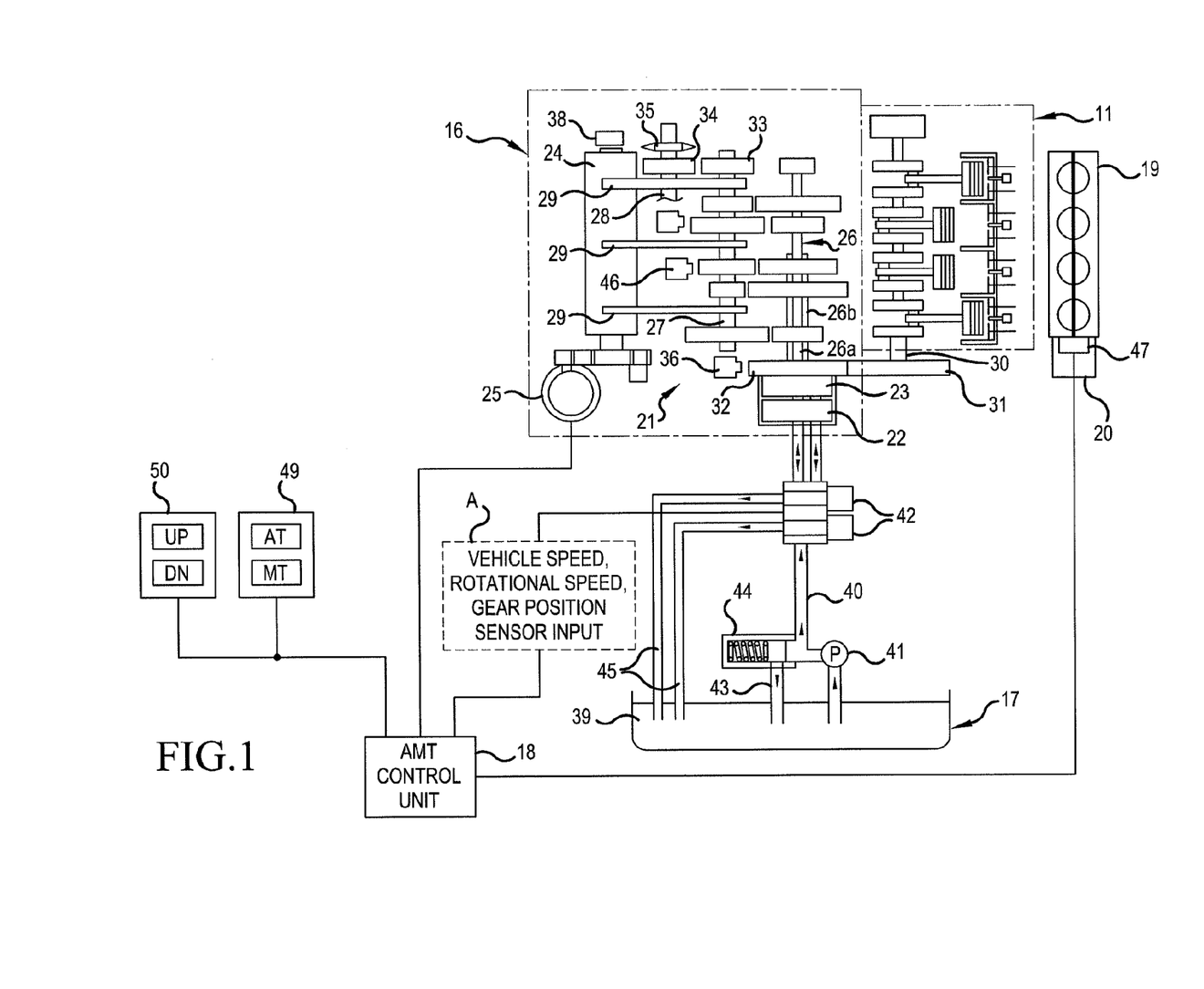
FIG. 1 is a system diagram of an automated manual transmission (AMT) and its peripheral devices applied to a motorcycle.

Preferred embodiments of the present invention will hereinafter be described in detail with reference to the drawings. FIG. 1 is a system diagram of an automated manual transmission (hereinafter referred to as an AMT) and an automatic transmission and its peripheral devices applied to a motorcycle. The AMT 16 coupled to an engine 11 is drivingly controlled by a clutch hydraulic device 17 and by an AMT control unit 18 as a speed-change control device. The engine 11 includes a throttle-by-wire type throttle body 19, which is equipped with a throttle opening-closing motor 20.

The AMT 16 includes a multi-step transmission gear 21, a first clutch 22, a second clutch 23, a shift drum 24, and a shift control motor 25 for turning the shift drum 24. A large number of gears constituting the transmission gear 21 are joined to or loosely fitted to a main shaft 26, to a counter shaft 27, and to a speed-change gear output shaft 28. The main shaft 26 is composed of an inner main shaft 26a and an outer main shaft 26b. The inner main shaft 26a is connected to the first clutch 22 and the outer main shaft 26b is connected to the second clutch 23. The main shaft 26 and the counter shaft 27 are each provided with a sleeve (not shown) displaceable in the axial direction thereof. Shift forks 29 are engaged at ends with associated guide grooves (not shown) formed on the sleeves and on the shift drum 24.

A primary driving gear 31 is joined to an output shaft, i.e., a crankshaft 30 of the engine and meshed with a primary driven gear 32. The primary driven gear 32 is connected to the inner main shaft 26a via the first clutch 22 and to the outer main shaft 26b via the second clutch 23.

A counter shaft output gear 33 joined to the counter shaft 27 is meshed with an output driven gear 34 joined to the speed-change gear output shaft 28. A drive sprocket 35 is joined to the speed-change output shaft 28. A drive chain (not shown) is wound around the drive sprocket 35. A drive force is transmitted to a rear wheel as a drive wheel via the drive chain. In addition, the AMT 16 internally includes an engine speed sensor 36 disposed to face the outer circumference of the primary driven gear 32, a counter shaft rotational speed sensor 46 disposed to face a fixed gear of the counter shaft 27 and a gear position sensor 38 for detecting a current gear step on the basis of the turning position of the shift drum 24 and for detecting a current gear step on the basis of the turning position of the shift drum 24. The throttle body 19 is equipped with a throttle sensor 47 for outputting a throttle opening angle signal.

The clutch hydraulic device 17 includes an oil tank 39 and a line 40 adapted to supply the oil in the oil tank 39 to the first clutch 22 and to the second clutch 23. A hydraulic pump 41 and a valve 42 as a hydraulic control valve composed of a solenoid valve or the like are provided on the line 40. A regulator 44 is installed on a return pipe 43 connected to the line 40. The valve 42 is constructed to be able to individually apply oil pressure to the first clutch 22 and to the second clutch 23. In addition, the valve 42 is provided with oil return pipes 45.

A mode switch 49 and a shift selector switch 50 are connected to the ATM control unit 18. The mode switch 49 performs switching between an automatic transmission (AT) mode and a manual transmission (MT) mode. The shift selector switch 50 instructs upshift (UP) or downshift (DN). The AMT control unit 18 includes a microcomputer (CPU), and controls the valve 42 and the shift control motor 25 in response to the output signals from the above-mentioned sensors to automatically or semi-automatically switch the gear steps of the AMT 16.

Upon selecting the AT mode, the AMT control unit 18 automatically switches the transmission gears 21 in response to information such as vehicle speed, engine speed, a throttle opening angle or the like. On the other hand, upon selecting the MT mode, the AMT control unit 18 upshifts or downshifts the transmission gear 21 along with the operation of the shift selector switch 50. In addition, the AMT control unit 18 can be set so that auxiliary automatic speed-change control can be exercised to prevent the excessive rotation and stall of the engine even upon selection of the MT mode.

In the clutch hydraulic device 17, hydraulic pressure applied to the valve 42 by the hydraulic pump 41 is controlled by the regulator 44 not to exceed an upper limit. If the valve 42 is opened by an instruction from the AMT control unit 18, the hydraulic pressure is applied to the first clutch 22 or to the second clutch 23 to connect the primary driven gear 32 with the inner main shaft 26a or the outer main shaft 26b via the first clutch 22 or the second clutch 23. If the valve 42 is closed to stop the application of the hydraulic pressure, the first clutch 22 and the second clutch 23 are biased by respective built-in return springs (not shown) in a direction of disconnecting the connection with the inner main shaft 26a and the outer main shaft 26b, respectively.

The shift control motor 25 turns the shift drum 24 in accordance with the instruction from the AMT control unit 18. If the shift drum 24 is turned, the shift fork 29 is displaced in the axial direction of the shift drum 24 in accordance with the shape of the guide groove formed on the outer circumference of the shift drum 24. This displacement changes the meshing between the respective gears on the counter shaft 27 and the main shaft 26 to switch the transmission gear 21 into a possible upshift or downshift.

The AMT 16 according to the present embodiment is constructed such that the inner main shaft 26a (see FIG. 1) connected to the first clutch 22 carries odd step gears (first, third and fifth speeds) and the outer main shaft 26b carries even step gears (second and fourth speeds) connected to the second clutch 23. For example, during operation with an odd step gear selected, hydraulic pressure is continuously supplied to the first clutch 22 to maintain the engagement state. When shifting is sequentially performed, the meshing of gears is previously changed by turning the shift drum 24 and then the respective engagement states of the first and second clutches 22, 23 are changed to complete the shifting.

Figure 2:
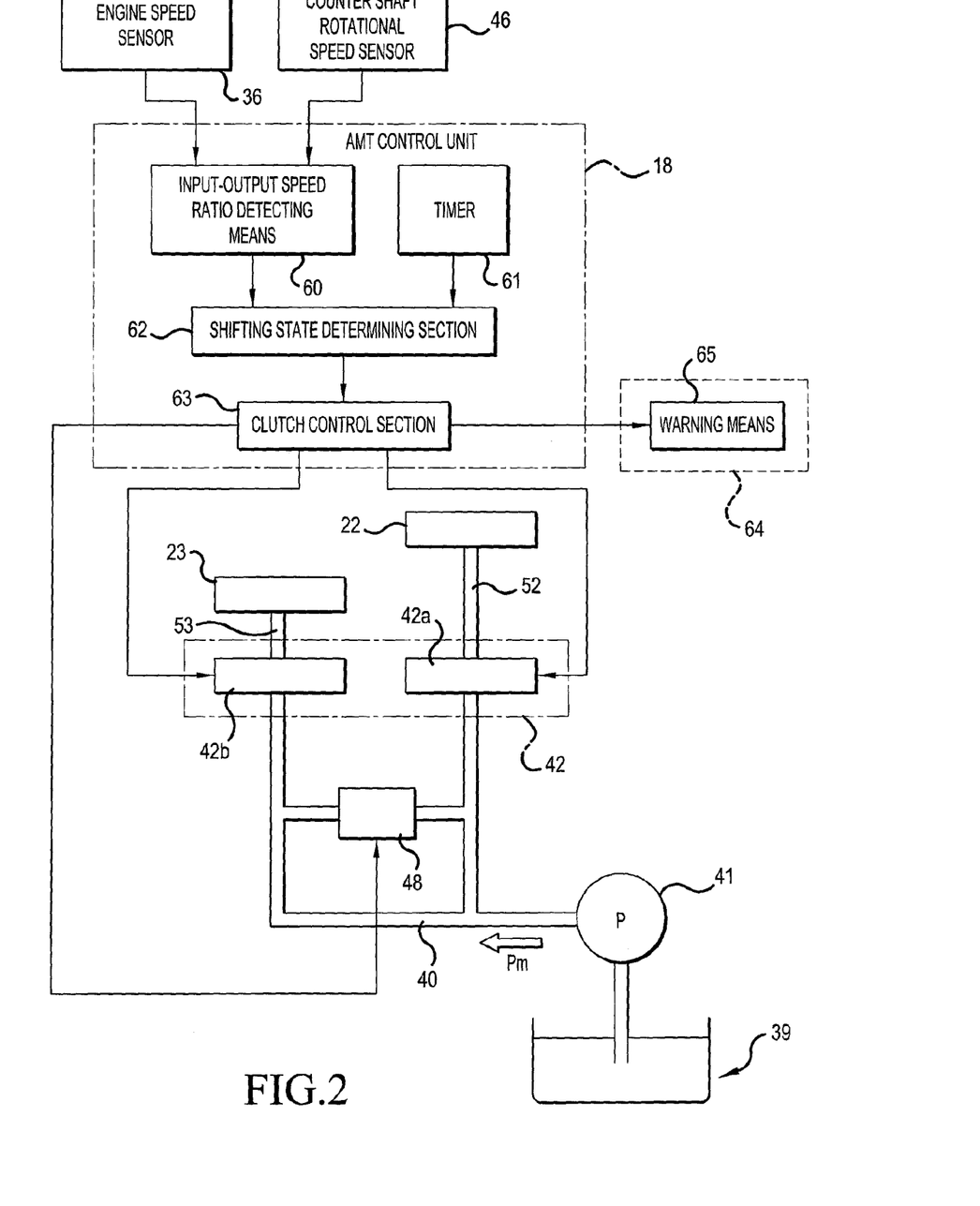
FIG. 2 is a block diagram illustrating a configuration of an AMT control unit and its peripheral devices.

FIG. 2 is a block diagram illustrating the configuration of the AMT control unit 18 and its peripheral devices according to the embodiment of the present invention. Like reference numerals denote like or corresponding parts. The AMT control unit 18 includes input-output speed ratio detecting means 60, a timer 61, a shifting state determining section 62, and a clutch control section 63. The input-output speed ratio detecting means 60 calculates a transmission gear ratio of the AMT 16 on the basis of respective signals output from the engine speed sensor 36 and from the counter shaft rotational speed sensor 46. The timer 61 measures an elapse time from the start of shifting. The shifting state determining section 62 detects the shifting state of the AMT 16 on the basis of information from the input-output speed ratio detecting means 60 and from the timer 61. The clutch control section 63 drives the valve 42 to exercise engagement-disengagement control on the first clutch 22 and the second clutch 23. In addition, the clutch control section 63 can drivingly control warning means 65 and pressure-increasing means 48. The warning means 65 is composed of a warning lamp, a buzzer or the like provided in an instrument 64 of the vehicle. The pressure-increasing means 48 can temporarily supply high-hydraulic pressure to the pipe line 40 connected to the hydraulic pump 41. In addition, the pressure-increasing means 48 can use a booster or the like using engine suction pressure.

Original hydraulic pressure Pm regulated by the regulator 44 (see FIG. 1) is generated in the hydraulic pump 41 during the operation of the engine. The original hydraulic pressure Pm is supplied to the valve 42 via the line 40. The valve 42 is composed of a first hydraulic control valve 42a adapted to control hydraulic pressure supply to the first clutch 22 and a second hydraulic control valve 42b adapted to control hydraulic pressure supply to the second clutch 23. Both the hydraulic control valves 42a, 42b are opened by a drive instruction from the AMT control unit 18. If the first hydraulic control valve 42a is opened to supply the original hydraulic pressure Pm to an oil passage 52, the first clutch 22 is driven to switch into the engagement state. On the other hand, if the second hydraulic control valve 42a is opened to supply the original hydraulic pressure Pm to an oil passage 53, the second clutch 23 is switched into the engagement state. The operation of the valve 42 according to the embodiment includes three patterns only the first hydraulic control valve 42a being energized to supply hydraulic pressure to the oil passage 52; only the second hydraulic control valve 42b being energized to supply hydraulic pressure to the oil passage 53; the energization of both the hydraulic control valves 42a, 42b is disconnected to stop the supply of hydraulic pressure. In the state where the supply of hydraulic pressure is stopped, both the first clutch 22 and the second clutch 23 are opened to provide a neutral state where the rotational drive force of the engine is not transmitted.

The AMT control unit 18 according to the embodiment is devised to be able to detect whether or not the shifting operation of the AMT 16 is executed as previously planned on the basis of the output signals from the input-output speed ratio detecting means 60 and the timer 61 described above.

Figure 3:
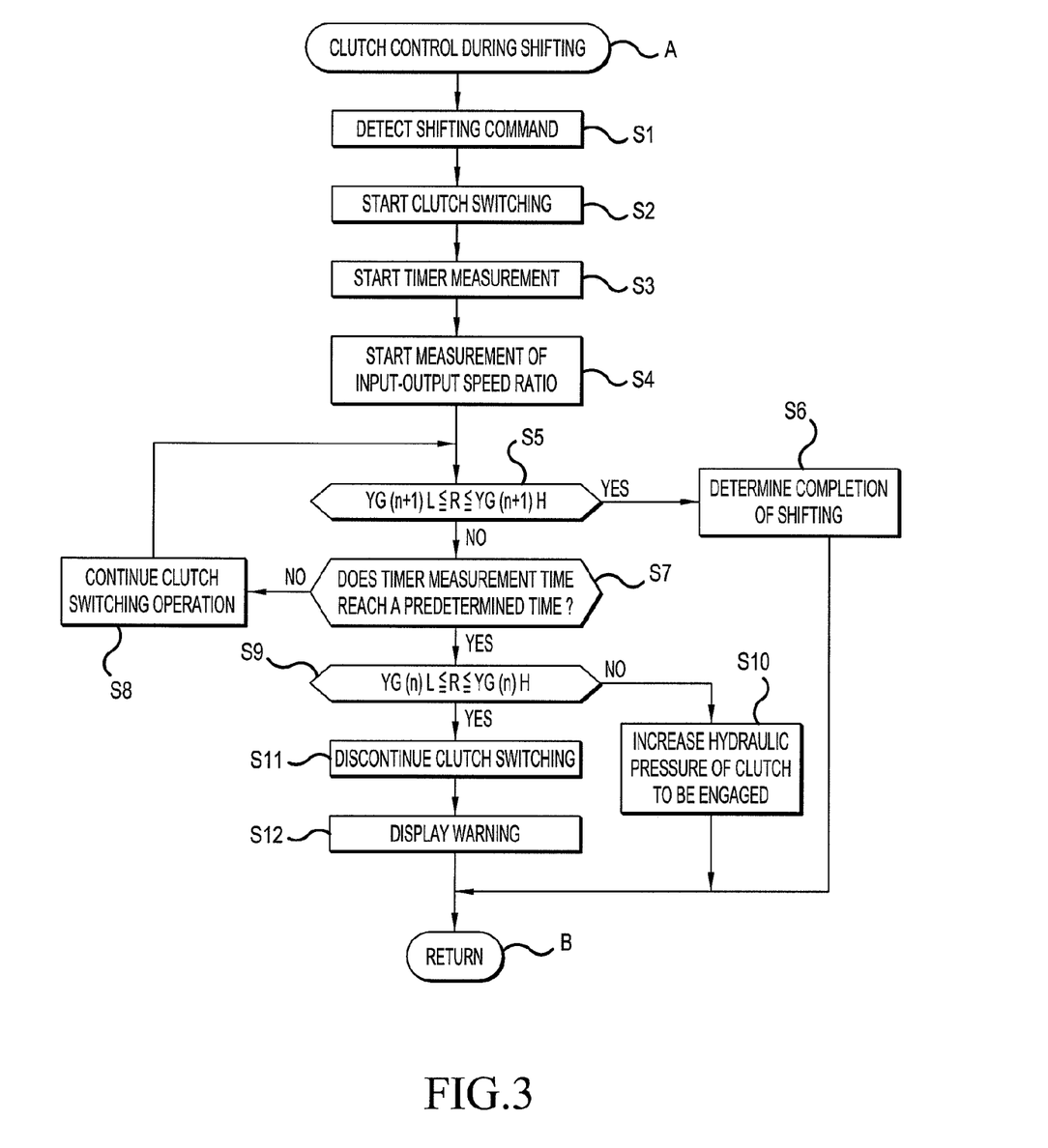
FIG. 3 is a flowchart illustrating a procedure for clutch control during shifting.

FIG. 3 is a flowchart illustrating a procedure for clutch control during shifting according to the embodiment. The flowchart is executed in the AMT control unit 18 at the time of upshifting or downshifting. This embodiment exemplifies the procedure during upshifting from the first-speed to the second-speed. If a shift command is detected in step S1, in step S2 the clutch control section 63 issues a drive command to the first hydraulic control valve 42a and to the second hydraulic control valve 42b, thereby starting the clutch switching operation. In the clutch switching operation, a clutch to be brought into the engagement state is switched from the first clutch 22 on one side to the second clutch 23 on the other side. In addition, in the automatic transmission (AT) mode the shifting command in step S1 is issued from the AMT control unit 18 on the basis of a shift map deriving shifting timing from engine speed, a gear position, vehicle speed and the like. On the other hand, in the manual transmission (MT) mode, the shifting command is issued on the basis of a signal outputted from the shift selector switch 50 (see FIG. 1) operated by an occupant.

In step 3, the timer 61 starts to measure an elapsed time t from the start of shifting operation, i.e., the start of clutch switching. Subsequently, in step 4, the input-output speed ratio detecting means 60 starts to measure an input-output speed ratio R which is a ratio between an engine rotational number (engine speed) and a counter shaft rotational number (rotational speed). In step 5, it is determined as to whether or not the input-output speed ratio R measured falls within a predetermined range not less than a determination lower limit of after-shifting gear step: $YG(n+1)L$ and not greater than a determination upper limit of after-shifting gear step: $YG(n+1)H$. In the expressions, symbol "n" represents a gear step number after shifting. If an affirmative determination is made in step S5, it is determined that the input-output speed ratio R is equal to a planned value after shifting and control proceeds to step 6. In step 6, it is determined that upshift has been completed as previously planned and control ends. In addition, the upper and lower margins are given to the determination value used to determine whether or not the shifting is completed. This is because of considering a measurement error resulting from the pulsation of the detected pulse of the rotational speed sensor, from noise contamination into the sensor, or from any other cause. If the first clutch 22 is disengaged as previously planned and the second clutch 23 is engaged as previously planned, the input-output speed ratio R surely falls within the predetermined range around a transmission gear ratio of a gear step after shifting.

If a negative determination is made in step S5, it is determined that upshift is not completed and control proceeds to step 7. In step 7, it is determined as to whether or not the measurement time t by the timer 61 reaches a predetermined time t_ref. If a negative determination is made in step S7, the clutch switching operation is to be continued in step 8 and control returns to step S5.

If an affirmative determination is made in step S7, control proceeds to step S9. In step 9, it is determined as to whether or not the input-output speed ratio R is not less than a determination lower limit: YG(n)L of a before-shifting gear step and not greater than a determination upper limit: YG(n)H of the before-shifting gear step. If an affirmative determination is made in step S9, it is determined that the input-output speed ratio R falls within the determination value of the before-shifting gear step even after the elapse of the predetermined time t_ref from the start of the clutch switching. This reveals that the switching operation of the clutch, i.e., shifting has not been completed as previously planned due to any cause. A description will hereinafter be given of the operation of the hydraulic clutches that is assumed if the affirmative determination is made in step 9 with reference to FIG. 4.

Figure 4:
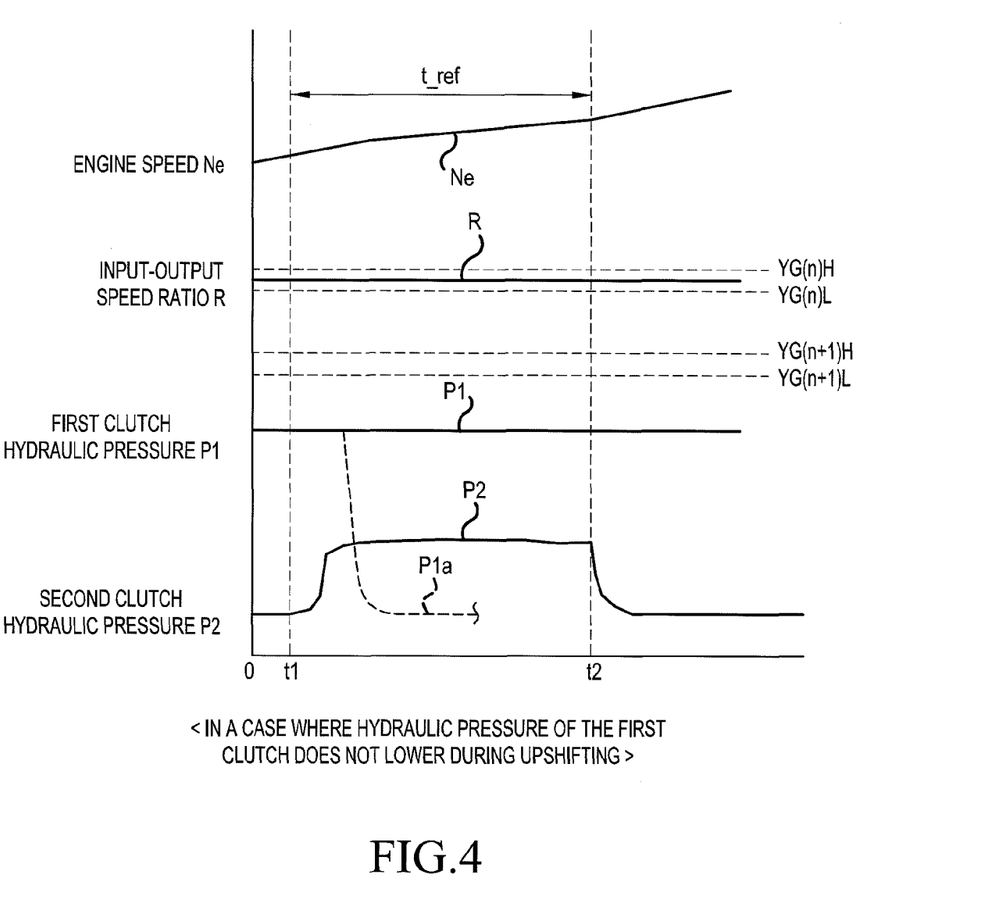
FIG. 4 is a graph illustrating the relationship between clutch hydraulic pressure and an input-output speed ratio when the switching of clutches is discontinued.

FIG. 4 is a graph illustrating the relationship between clutch hydraulic pressure and an input-output speed ratio by way of example. FIG. 4 illustrates the transition of engine speed Ne, an input-output speed ratio R, a first clutch hydraulic pressure P1 and a second clutch hydraulic pressure P2 arising during upshifting from the first-speed to the second-speed by the switching operation from the first clutch 22 to the second clutch 23.

Upon receipt of an upshift command at time t1, the clutch control section 63 interrupts an electric current supplied to the first hydraulic control valve 42a and starts to supply an electric current to the second hydraulic control valve 42b, thereby starting the clutch switching operation. However, as illustrated in FIG. 4, although an electric current supplied to the first hydraulic control valve 42a is interrupted, the first clutch hydraulic pressure P1 does not lower as previously planned due to any failure. This causes a failure of maintaining the engagement state of the first clutch 22. Thus, the input-output speed ratio R does not lower from the transmission gear ratio of the first-speed gear, the elapsed time t after the start of shifting reaches t_ref at time t2, and the negative determinations in steps S5 and S7 are made. The predetermined time t_ref at which the determinations of steps S5, S7 are made can be set to an expected time in which if no failure occurs, the hydraulic pressure of the first clutch 22 lowers as indicated with a broken line P1a to bring the first clutch 22 into the disengagement state.

With additional reference to the flowchart of FIG. 3, in step S7 mentioned above, it is determined as to whether or not the time measured by the timer 61 reaches the predetermined time t_ref. In FIG. 4, since time t2 is reached, the affirmative determination is made in step S7 and control proceeds to step S9. In step S9, it may be determined that the input-output speed ratio R falls within the determination value of the before-shifting gear step. This reveals the following failure. Even after the elapse of the predetermined time t_ref from the start of clutch switching operation, the first clutch 22 is in the engagement state, that is, the hydraulic pressure P1 of the first clutch 22 does not lower as previously planned.

The clutch control during shifting according to the embodiment has the following feature. If the affirmative determination is made in step S9, control proceeds to step S11 (see FIG. 3). In step S11, the shifting state determining section 62 transmits the fact that the first clutch side causes a failure to the clutch control section 63. In addition, the clutch control section 63 drives the valve 42 to discontinue the switching of the clutch.

The discontinuation of the switching operation of the clutch in step S11 is executed by interrupting an electric current supplied to the second hydraulic control valve 42b to bring the second clutch 23 into the disengagement state. If the discontinuation of the clutch switching operation is not executed, the hydraulic pressure is continuously supplied to the second clutch 23 with the first clutch 22 remaining in the engagement state. This causes an interlock state in which the two clutches different in rotational speed from each other simultaneously come into the engagement state, and which puts a load on the clutches. In this embodiment, since the determination is made at time t2 and the second clutch 23 is switched into the disengagement state, such an interlock state can quickly be avoided.

The switching of the clutch is discontinued in step S11. In step S12, the clutch control section 63 drives the warning means 65 (see FIG. 2) to warn the occupant that the switching of the clutch has been discontinued and a sequence of control ends. In addition, the warning means 65 identifies on which side of the first clutch 22 and the second clutch 23 a failure has been occurring and displays it on a liquid crystal panel or the like. The occupant of the vehicle can take measures such as discontinuing the operation of the vehicle and performing checking and repairing. The processing performed when the affirmative determination is made in step 9 is described thus far. A description is below given of the operation of the clutch assumed when the negative determination is made in step 9 with reference to FIG. 5.

Figure 5:
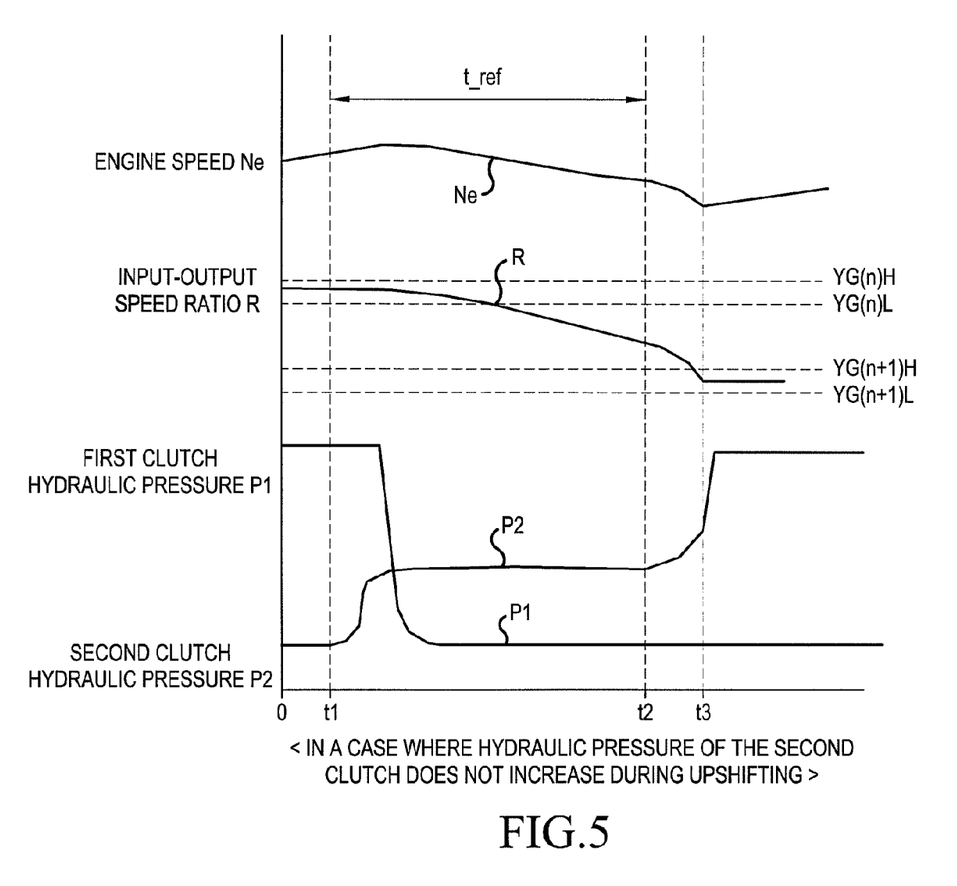
FIG. 5 is a graph illustrating the relationship between clutch hydraulic pressure and an input-output speed ratio when clutch hydraulic pressure is increased.

FIG. 5 is a graph illustrating the relationship between clutch hydraulic pressure and an input-output speed ratio by way of example. Like reference numerals denote like or corresponding parts. As with the example of FIG. 4, upon receipt of an upshift instruction at time t1, the clutch control section 63 interrupts an electric current supplied to the first hydraulic control valve 42a and starts to supply an electric current to the second hydraulic control valve 42b, thereby starting the clutch switching operation. However, in the case of FIG. 5, as the electric current supplied to the first hydraulic control valve 42a is interrupted, the hydraulic pressure P1 of the first clutch 22 is lowered as previously planned. On the other hand, although an electric current is started to be supplied to the second hydraulic control valve 42b, the second clutch hydraulic pressure P2 is not increased as previously planned due to any failure, which cause a problem where the second clutch 23 is not switched into the complete engagement state. Thus, the input-output speed ratio R is not lowered from the transmission gear ratio of the first-speed gear so that the determination of step S5 mentioned above is negative.

Next, the determination of step S7 is made. If time t3 is reached, the determination of step S7 is affirmative and control proceeds to step S9. In step S9, the determination may be negative, that is, the input-output speed ratio R may be determined to be outside the determination value of the before-shifting gear step. This reveals that the following failure occurs. Even after the elapse of the predetermined time t_ref from the start of the switching of the clutch, the second clutch 23 is not switched into the complete engagement state. That is to say, the second clutch hydraulic pressure P2 does not increase sufficiently. The example of FIG. 5 has the following feature. If the negative determination is made in step S9, control proceeds to step S10 (see FIG. 3). In step S10 the hydraulic pressure of a clutch to be engaged, i.e., of the second clutch 23 is increased to forcibly complete the upshift at time t3.

The pressure-increasing processing in step S10 is executed by allowing the clutch control section 63 to drive the pressure increasing means 48 (see FIG. 2). If this pressure-increasing is not executed, the partial engagement state of the second clutch 23 is maintained. Thus, the shifting is not completed and a load is put on the clutch. In addition, if the pressure-increasing means 48 is not provided, processing may be executed in which the second clutch 23 is disengaged while the first clutch 22 is re-engaged, whereby processing may be done for returning the state to the state before the start of the shifting.

As described above, the clutch control system of a transmission according to the present invention discontinues the switching operation of clutches if the elapsed time from the start of the clutch switching operation reaches the predetermined time and the input-output speed ratio falls within the predetermined range corresponding to the before-shifting gear step. Thus, on the basis of the value of the input-output speed ratio the system detects the fact that one of the clutches that is to be switched into the disengagement state at the time of shifting remains in the engagement state. This makes it possible to discontinue the switching operation of the clutches, thereby avoiding the interlock of the clutches. In addition, without the provision of a sensor for detecting the hydraulic pressure of the clutch the system can detect the fact that one of the clutches remains in the engagement state, thereby avoiding the interlock.

Further, if the elapsed time from the start of the clutch switching operation reaches the predetermined time and the input-output speed ratio lies outside the predetermined range corresponding to the before-shifting gear step, the hydraulic pressure supplied to the other of the clutches is increased by the pressure-increasing means. Thus, it can be detected based on the value of the input-output speed ratio that the other of the clutches that is to be switched into the engagement state at the time of shifting remains between the disengagement state and the engagement state and the hydraulic pressure supplied to the other of the clutches can be increased to complete the shifting.

In addition, the embodiment described above exemplifies the upshifting from the first-speed to the second-speed. However, the clutch control according to the present invention can similarly be applied to upshifting or downshifting from an even step to an odd step, or from an odd step to an even step. The step number of the gear steps of the transmission, the measurement time of the timer and the like are not limited to those of the embodiment but can be modified in various ways. For example, the number of gear steps of the transmission may be configured to provide a plurality of forward steps and a reverse step. The clutch control according to the present invention can be applied to transmissions that are provided with three or more hydraulic clutches, one side clutch thereof and the other side clutch thereof each being multiple.

Figure 6:
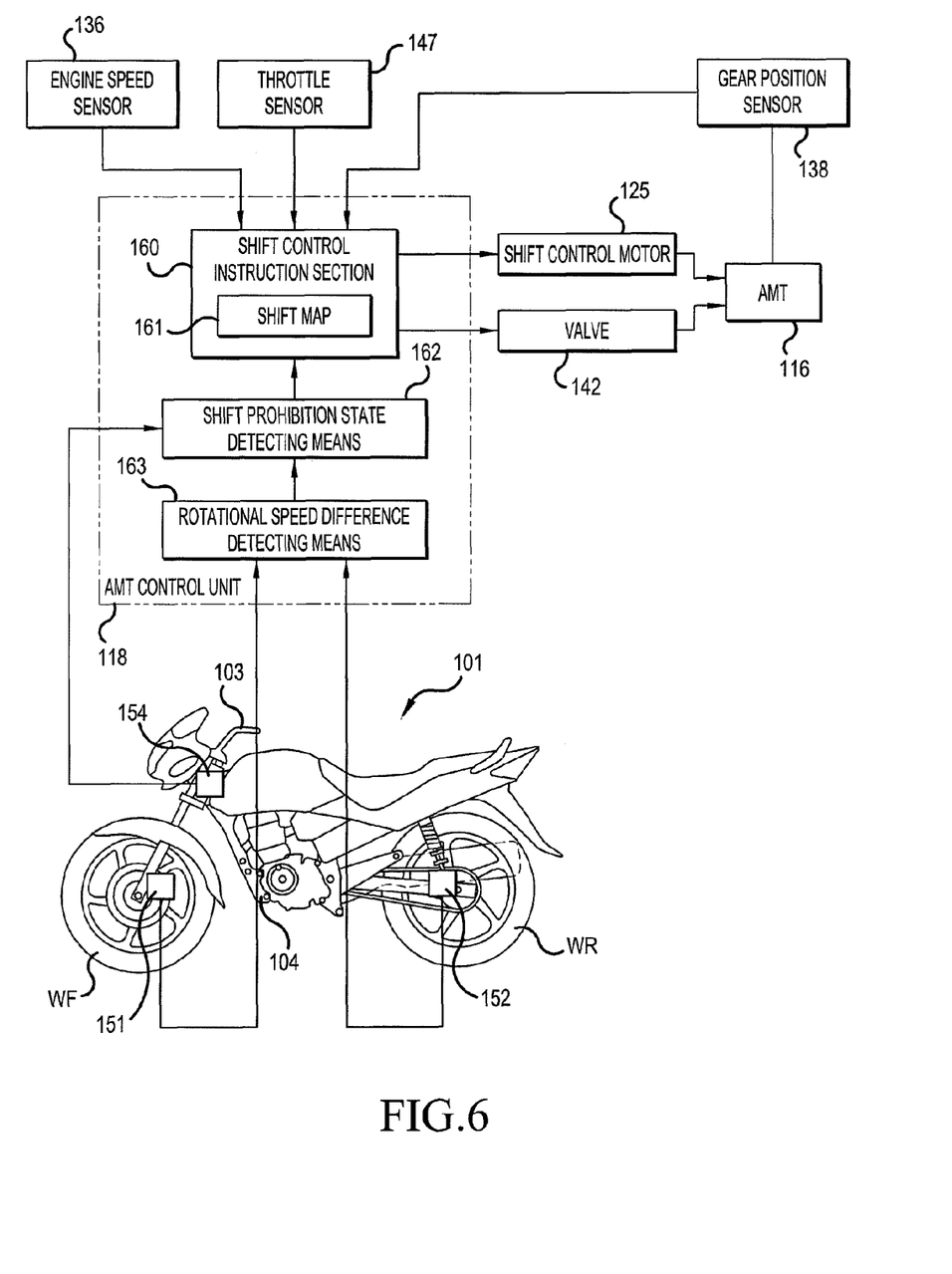
FIG. 6 is a block diagram illustrating a configuration of an AMT control unit and its peripheral devices according to an embodiment of the present invention.

FIG. 6 is a block diagram illustrating a configuration of the AMT control unit and its peripheral devices according to an embodiment of the present invention. Like reference numerals denote like or corresponding parts. The AMT control unit 118 includes a shift control instruction section 160 stored with a shift map 161 therein; shift prohibition state detecting means 162; and rotational speed difference detecting means 163. The shift control instruction section 160 as a control section is constructed to drive a shift control motor 125 and a valve 142 in accordance with the shift map 161 made up of a three-dimensional map or the like on the basis of signals outputted from an engine speed sensor 136, a throttle sensor 147, and a gear position sensor 138 and of vehicle speed information.

Steering handlebars 103 for steering a front wheel WF as a driven wheel are turnably supported forward of a body frame 104 of the motorcycle 101. A rear wheel WR as a driving wheel is rotatably supported by the rear end of a swing arm coupled to the rear side of the body frame 104. A steering angle sensor 154 as steering angle detecting means is attached at a position close to the turning shaft of the steering handlebar 103. The steering angle sensor 154 can detect the turning angle of the turning shaft of the steering handlebars 103 using a volume switch, a magnetic sensor, an optical sensor or the like.

In the present embodiment, the steering angle of the front wheel WF means an angle formed between the advancing direction of the front wheel WF and the back and forth direction of the vehicle body when the front wheel WF is viewed from the upper surface of the vehicle body. In general, the turning shaft of the steering handlebars 103 and a front fork rotatably supporting the front wheel WF are mounted to slant rearward. This causes a slight difference between a turning angle detected by the steering angle sensor 154 and an actual steering angle. This difference can easily be calculated based on design dimensions.

The gear shift control apparatus of the motorcycle according to the present embodiment includes a first sensor 151 for detecting the rotational speed of the front wheel WF and a second sensor 152 for detecting the rotational speed of the rear wheel WR. This apparatus is configured such that the rotational speed difference detecting means 163 can detect a difference in rotational speed between the front and rear wheels. In addition, vehicle speed during normal traveling may be detected by any one of the first and second sensors. Preferably, the first sensor 151 and the second sensor 152 each are a non-contact sensor that uses a hall element or the like to measure a transit interval of a pickup portion attached to the associated wheel. In addition, the rotational speed of the rear wheel WR may be measured by a sensor for detecting the rotational speed of a speed-change gear inside the AMT 116 instead of the second sensor 152.

A motorcycle operating with only a front and a rear wheel arranged in the back and forth direction of a vehicle body linearly operates at a speed equal to or more than a certain level and is most stable when the vehicle body is upright. In contrast, during a turning maneuver (cornering), the lean angle (the bank angle) of the vehicle body and the steering angle of the front wheel WF are changed into various states depending on the combination of the vehicle speed with a turning radius. This turning maneuver includes e.g., a high-speed turning maneuver with the vehicle body banked, low- and middle-speed turning maneuvers in a right or left turn at an intersection or in a U-turn as well as push-walk-turning using the drive force of the engine with the handlebars steered.

The general automatic transmission sequentially executes gear shifting in response to vehicle speed and engine speed regardless of during a turning maneuver or not. However, it is needed to improve the operational feel by fixing a gear step during turning. To deal with the problem described above, the gear shift control apparatus for a motorcycle according to the embodiment is characterized in that the rotational speed of each of the front and rear wheels is detected, and if a predetermined rotational speed difference between the front and rear wheels is detected, it is determined as during a turning maneuver and the automatic gear shifting of the transmission is prohibited.

The rotational speed difference detecting means 163 compares information derived from the first sensor 151 for detecting the rotational speed of the front wheel WF with information derived from the second sensor 152 for detecting the rotational speed of the rear wheel WR for calculating a difference in rotational speed between the front and rear wheels. It may be detected that the rotational speed of the front wheel WF is greater than that of the rear wheel WR and the rotational speed difference exceeds a predetermined value. In such a case, the shift prohibition state detecting means 162 transmits information to the shift control instruction section 160 to the effect that gear shifting is in a state to be prohibited, thus prohibiting gear shifting operation. In addition, the steering angle sensor 154 for inputting an output signal to the shift prohibition state detecting means 162 is described later.

Figure 7:
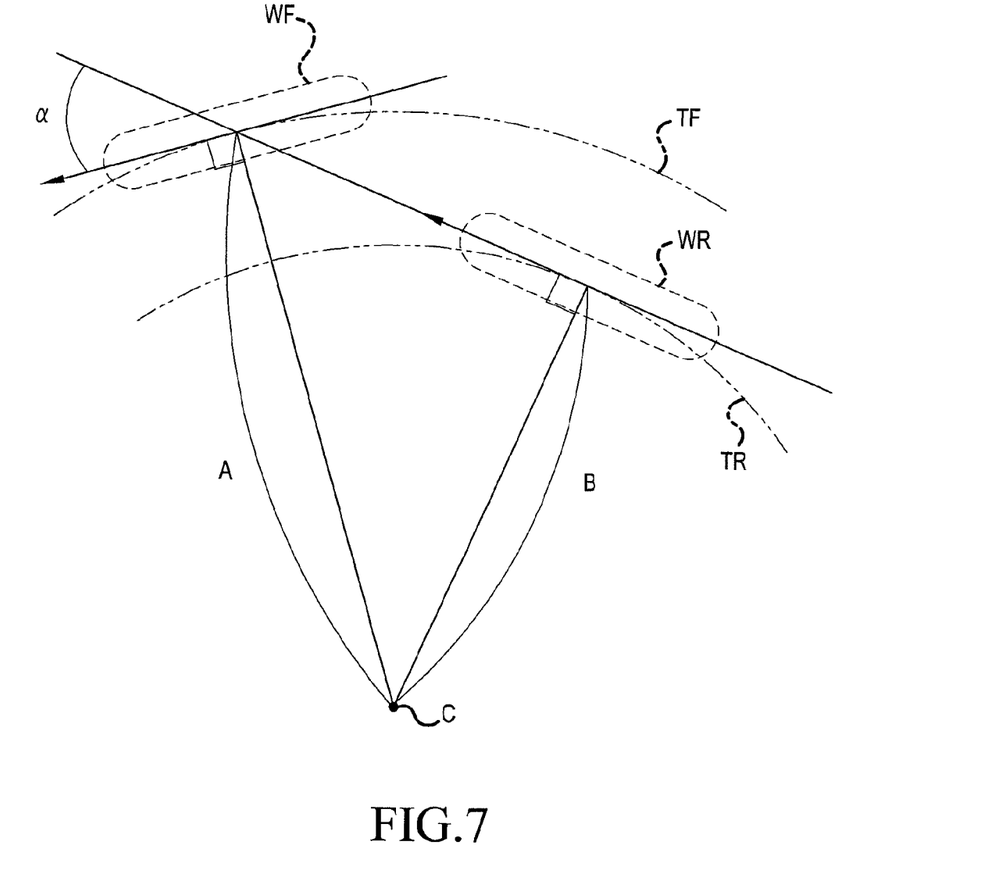
FIG. 7 is a schematic diagram illustrating a state of a motorcycle being in a turning maneuver.

FIG. 7 is a schematic diagram illustrating a state of the motorcycle during a turning maneuver. FIG. 7 illustrates a state wherein the motorcycle 1 is in a turning maneuver in a counterclockwise direction while the steering handlebars 3 thereof are steered leftward to cause the steering angle α. In this case, the interaxle distance between the center of the front wheel WF and the center of the rear wheel WR is maintained. Therefore, the front wheel transit trajectory TF of the front wheel WF and the rear wheel transit trajectory TR of the rear wheel WR do not pass on the identical line. This causes a difference between a front wheel turning radius A and a rear wheel turning radius B. The front wheel turning radius A is a distance from the turning center C to the front wheel transit trajectory TF. The rear wheel turning radius B is a distance from the turning center C to the rear wheel transit trajectory TR. Consequently, the rotational speed of the front wheel WF passing the front wheel transit trajectory TF is greater than that of the rear wheel WR passing the rear wheel transit trajectory TR. The use of this characteristic can detect that the vehicle is in a turning maneuver by detecting the difference in rotational speed between the front and rear wheels. The difference in turning radius between the front and rear wheels is large particularly if the vehicle speed is low and the steering angle α is large. In addition, the larger the difference in turning radius between the front and rear wheels, the larger the difference in rotational speed between the front and rear wheels. The present invention is characterized in that the characteristic of the motorcycle is used to detect from the rotational speed difference between the front and rear wheels that the motorcycle is in a turning maneuver and prohibit the automatic gear shifting during the turning maneuver.

Figure 8:
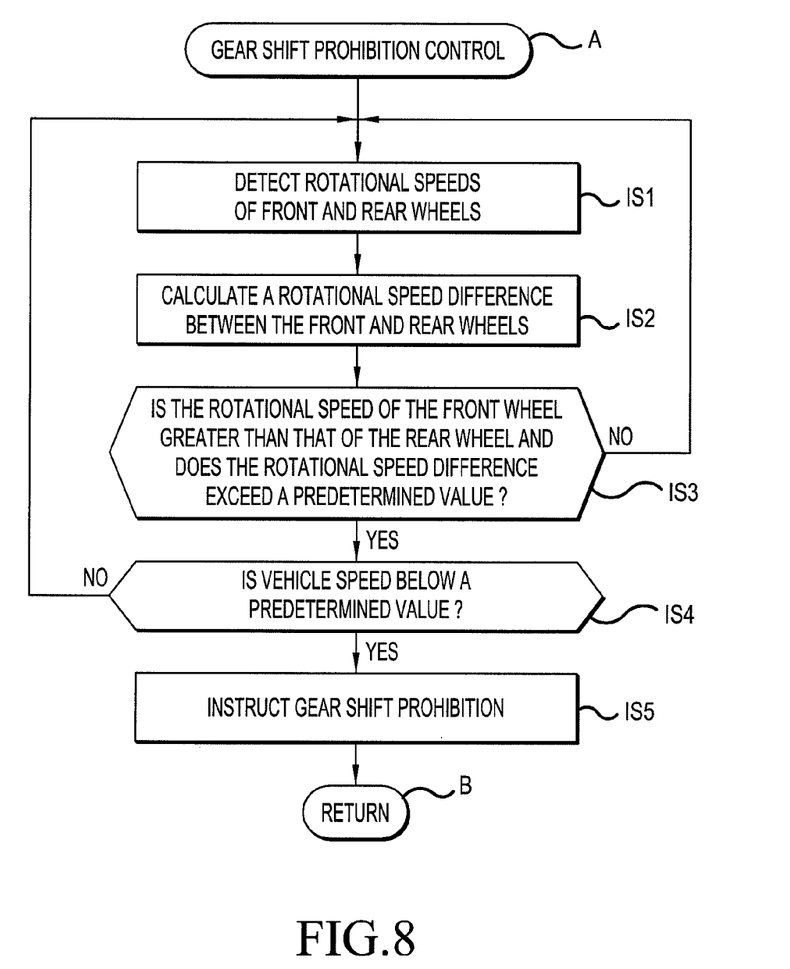
FIG. 8 is a flowchart illustrating a flow of automatic gear shifting prohibition control according to an embodiment of the present invention.

FIG. 8 is a flowchart illustrating a flow of automatic gear shifting prohibition control according to an embodiment of the present invention. In step 1S1, the first sensor 151 and the second sensor 152 detect the rotational speed of the front wheel and that of the rear wheel, respectively. In step 1S2, the rotational speed difference detecting means 163 calculates a difference in rotational speed between the front and rear wheels. In step 1S3, a determination is made as to whether or not the rotational speed of the front wheel WF is greater than that of the rear wheel RW and whether or not the rotational speed difference exceeds a predetermined value (e.g. 5 km/h by vehicle speed conversion). If an affirmative determination is made, control proceeds to step 1S4. In step 1S4, the shift prohibition state detecting means 162 determines whether or not the vehicle speed is below a predetermined value (e.g. 10 km/h). If an affirmative determination is made, control proceeds to step 1S5. In addition, if a negative determination is made in each of steps 1S3 and 1S4, control returns to step 1S1. In step 1S5, a shift prohibition instruction is issued to the shift control instruction section 160, which prohibits the shift control motor 125 and the valve 142 from being driven. Then, a sequence of the automatic gear shift prohibition control ends. In addition, it may be designed that if the vehicle returns to the normal traveling state from the turning maneuver state during prohibition of the automatic gear shifting, the automatic gear shifting prohibition control is switched to a normal automatic gear shifting control. In addition, the determination as to whether or not the motorcycle is in a turning maneuver may be made only in step 1S3 described above.

Figure 9:
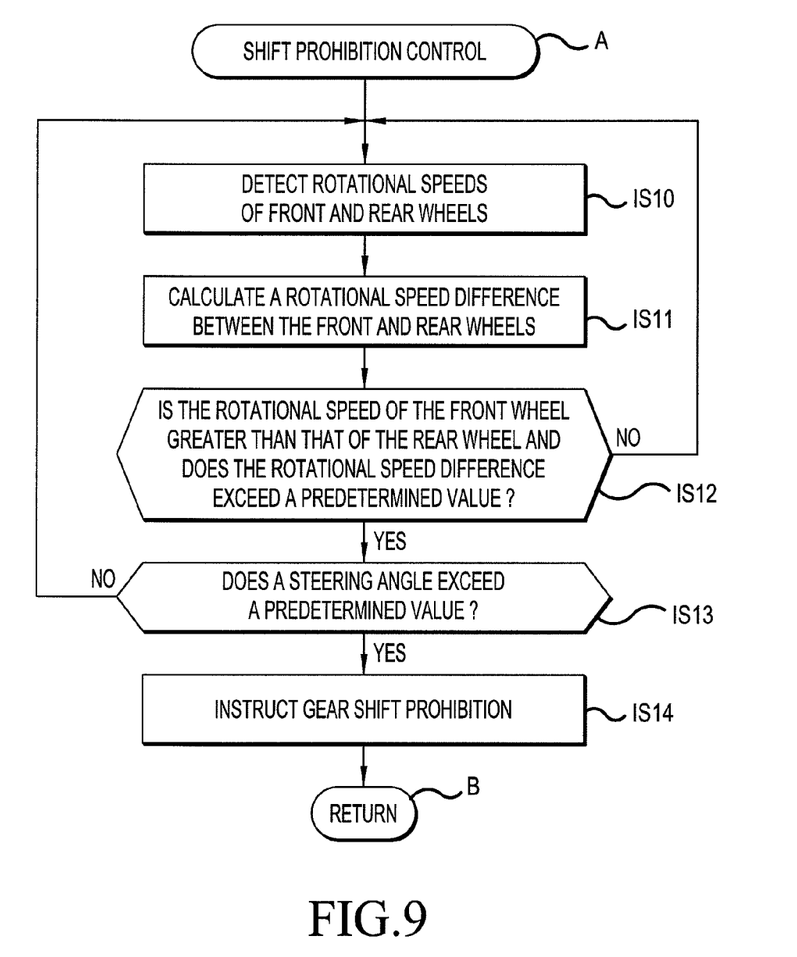
FIG. 9 is a flowchart illustrating a flow of automatic gear shifting prohibition control according to a modification of the embodiment of the present invention.

FIG. 9 is a flowchart illustrating a flow of automatic gear shifting prohibition control according to a modification of the embodiment of the present invention. This modification is characterized by adding the magnitude of a steering angle to the conditions for determining as to whether to be in a turning maneuver. The motorcycle has a characteristic in which if it travels at the same turning radius, as vehicle speed increases, the bank angle increases whereas the steering angle decreases. The use of the characteristic can accurately detect that the vehicle is in a turning maneuver at low vehicle speed by detecting the magnitude of a steering angle. Thus, the gear shifting operation of the automatic transmission can be prohibited.

The flow of the flowchart of FIG. 9 is the same as that of FIG. 8 except step 1S13; therefore, the explanation of the same portion is partially omitted. In step 1S10 the respective rotational speeds of the front and rear wheels are detected and in step 1S11 a difference in rotational speed between the front and rear wheels is calculated. In step 1S12, a determination is made as to whether or not the rotational speed of the front wheel is greater than that of the rear wheel and as to whether or not the rotational speed difference exceeds a predetermined value. If an affirmative determination is made, control proceeds to step 1S13. In step 1S13, the shift prohibition state detecting means 162 determines whether or not the steering angle detected by the steering angle sensor 154 exceeds a predetermined value (e.g. 30 degrees). If an affirmative determination is made, control proceeds to step 1S14. If a negative determination is made in step 1S12 or 1S13, control returns to step 1S10. In step 1S14, a shifting prohibition instruction is issued to the shift control instruction section 160. Thus, a sequence of automatic gear shifting prohibition control ends. In the modification, the determination of the front wheel steering angle as well as the rotational speed difference between the front and rear wheels is added to the conditions for determining whether or not to be in a turning maneuver. Therefore, it is possible to prevent a locking state of only the rear wheel WF caused by sudden braking or other states from being erroneously determined as a turning maneuver.

As described above, focusing on the fact that a difference in rotational speed between the front and rear wheels occurs during a turning maneuver, the gear shift control apparatus for a motorcycle according to the present invention determines that the vehicle is in a turning maneuver if the rotational speed of the front wheel is greater than that of the rear wheel and the rotational speed difference is greater than a predetermined value, and prohibits the automatic gear shifting. Thus, without the provision of a device such as a transverse G sensor or the like, the apparatus can prohibit the gear shifting operation during the turning maneuver by determining that the vehicle is in a turning maneuver from the rotational speeds of the front and rear wheels. This can maintain a constant gear step during a turning maneuver, thereby enhancing a operational feeling.

In addition, the constructions of the motorcycle and of the automatic transmission, the construction of the front and rear wheel rotational speed sensors and of the steering angle sensor and other constructions are not limited to those of the embodiment described above but can be modified in various ways. For example, the automatic transmission may be replaced with a continuously variable transmission combining pulleys with a belt. In addition, the values of the rotational speed difference between the front and rear wheels, of the vehicle speed, of the steering angle of the front wheel and other values can variously be set in accordance with the body construction of the motorcycle or the like.

The invention being thus described, it will be obvious that the same may be varied in many ways. Such variations are not to be regarded as a departure from the spirit and scope of the invention, and all such modifications would be obvious to one skilled in the art are intended to be included within the scope of the following claims.

What is claimed is:

1. A clutch control system for a transmission having at least a first hydraulic clutch and a second hydraulic clutch, the clutch control system comprising:
    a control section configured to control a supply of hydraulic pressure to each of the first and second hydraulic clutches switched from a disengagement state to an engagement state upon receiving a predetermined hydraulic pressure generated by a single hydraulic pump;
    a transmission in which a shifting operation to an adjacent gear step occurs by operation of switching the engagement state from the first hydraulic clutch to the second hydraulic clutch;
    a conduit connected to the single hydraulic pump, the conduit having a first branch for supplying oil to the first hydraulic clutch and a second branch for supplying oil to the second hydraulic clutch; and
    pressure-increasing means adapted to use engine suction pressure for temporarily increasing the hydraulic pressure supplied to each of the hydraulic clutches;
    wherein the control section discontinues the switching operation of the hydraulic clutches if an elapsed time from a start of the switching operation reaches a predetermined time and the input-output speed ratio falls within a predetermined range corresponding to a gear step before the shifting operation,
    wherein the pressure increasing means is connected to each of the first and second branches of the conduit, and, under a specific condition, is adapted to function as a booster for temporarily supplying high-hydraulic pressure to each of the first and second hydraulic clutches,
    wherein the predetermined range corresponding to a gear step before the shifting operation is not less than a determined lower limit of after-shifting gear steps YG(n+1)L and not greater than a determined upper limit of after-shifting gear steps YG(n+1)H.

2. The clutch control system for a transmission according to claim 1, wherein the control section discontinues the switching operation by switching the second hydraulic clutch into the disengagement state.

3. The clutch control system for a transmission according to claim 1, and further comprising warning means for warning that the switching operation is discontinued and identifying if either of the first hydraulic clutch and the second hydraulic clutch has a failure, and displaying an indication of the failure on a display.

4. The clutch control system for a transmission according to claim 1, further comprising:
    input-output speed ratio detecting means for detecting an input-output speed ratio of the transmission; and
    wherein the control section allows the pressure-increasing means to increase the hydraulic pressure supplied to the second hydraulic clutch if an elapsed time from start of the switching operation reaches the predetermined time and the input-output speed ratio lies outside the predetermined range corresponding to a gear step before the shifting operation.

5. The clutch control system for a transmission according to claim 1, and further including a mode switch for performing a switching between an automatic transmission and a manual transmission mode.

6. The clutch control system for a transmission according to claim 1 wherein, if the input-output speed ratio is not less than a determined lower limit YG(n)L of a before-shifting gear step and is not greater than a determined upper limit YG(n)H of the before-shifting gear step, it is determined that the input-output speed ratio falls within a predetermined value of the before-shifting gear step even after the predetermined time has elapsed from the start of the shifting operation.

7. The clutch control system for a transmission according to claim 6 wherein if an affirmative determination is made, a shifting state determining section transmits an input that the switching operation of the first hydraulic clutch has failed to the control section for driving a first hydraulic control valve and a second hydraulic control valve to discontinue the switching of the clutches.

8. The clutch control system for a transmission according to claim 7, wherein discontinuing of the switching of the clutches is implemented by an electric current supplied to the second hydraulic control valve to bring the clutch on the second hydraulic clutch into the disengagement state.

9. A clutch control system for a transmission having at least a first hydraulic clutch and a second hydraulic clutch, the clutch control system comprising:
    a control section configured to control a supply of hydraulic pressure to each of the first and second hydraulic clutches switched from a disengagement state to an engagement state upon receiving a predetermined hydraulic pressure generated by a single hydraulic pump;
    a transmission in which a shifting operation to an adjacent gear step occurs by operation of switching the engagement state from the first hydraulic clutch to the second hydraulic clutch;
    input-output speed ratio detecting means for detecting an input-output speed ratio of the transmission;
    a conduit connected to the single hydraulic pump, the conduit having a first branch for supplying oil to the first hydraulic clutch and a second branch for supplying oil to the second hydraulic clutch; and
    pressure-increasing means adapted to use engine suction pressure for temporarily increasing the hydraulic pressure supplied to each of the hydraulic clutches;
    wherein the pressure increasing means is connected to each of the first and second branches of the conduit, and, under a specific condition, is adapted to function as a booster for temporarily supplying high-hydraulic pressure to each of the first and second hydraulic clutches, and
    the control section allows the pressure-increasing means to increase the hydraulic pressure supplied to the second hydraulic clutch clutches if an elapsed time from start of the switching operation reaches a predetermined time and the input-output speed ratio lies outside a predetermined range corresponding to a gear step before the shifting operation,
    wherein the predetermined range corresponding to a gear step before the shifting operation is not less than a determined lower limit of after-shifting gear steps YG(n+1)L and not greater than a determined upper limit of after-shifting gear steps YG(n+1)H.

10. The clutch control system for a transmission according to claim 9, wherein the control section discontinues the switching operation by switching the second hydraulic clutch into the disengagement state.

11. The clutch control system for a transmission according to claim 9, and further comprising warning means for warning that the switching operation is discontinued and identifying if either of the first hydraulic clutch and the second hydraulic clutch has a failure, and displaying an indication of the failure on a display.

12. The clutch control system for a transmission according to claim 9, wherein the control section discontinues the switching operation of the hydraulic clutches if an elapsed time from a start of the switching operation reaches the predetermined time and the input-output speed ratio falls within the predetermined range corresponding to a gear step before the shifting operation.

13. The clutch control system for a transmission according to claim 9, and further including a mode switch for performing a switching between an automatic transmission and a manual transmission mode.

14. The clutch control system for a transmission according to claim 1, wherein the control section is configured to execute automatic gear shifting on the transmission in response to at least vehicle speed; and
    rotational speed difference detecting means for detecting a difference in rotational speed between a front wheel and a rear wheel;
    wherein, if the rotational speed of the front wheel is greater than that of the rear wheel and the rotational speed difference exceeds a predetermined value, the control section determines that the motorcycle is in a turning maneuver and prohibits the automatic gear shifting.

15. The clutch control system for a transmission according to claim 14, wherein the control section prohibits the automatic gear shifting if the rotational speed difference exceeds the predetermined value and the vehicle speed is below the predetermined value.

16. The clutch control system for a transmission according to claim 14, and further comprising:
    steering angle detecting means for detecting a steering angle of the front wheel;
    wherein the control section prohibits the automatic gear shifting if the rotational speed difference exceeds the predetermined value and the steering angle exceeds the predetermined value.

17. The clutch control system for a transmission according to claim 15, and further comprising:
    steering angle detecting means for detecting a steering angle of the front wheel;
    wherein the control section prohibits the automatic gear shifting if the rotational speed difference exceeds the predetermined value and the steering angle exceeds the predetermined value.

18. The clutch control system for a transmission according to claim 1, wherein the first hydraulic clutch and the second hydraulic clutch are positioned adjacent to each other in an axial directional of the hydraulic clutches.

* * * * *